US006845488B1

United States Patent
Shim et al.

(10) Patent No.: US 6,845,488 B1
(45) Date of Patent: Jan. 18, 2005

(54) MULTI-LINE EDITOR FOR COMPACT DISPLAY

(75) Inventors: Jae H. Shim, San Jose, CA (US); Kazuyoshi Onuka, San Jose, CA (US)

(73) Assignee: Mobigence, Inc., San Jose, CA (US)

( * ) Notice: Subject to any disclaimer, the term of this patent is extended or adjusted under 35 U.S.C. 154(b) by 469 days.

(21) Appl. No.: 09/834,265

(22) Filed: Apr. 11, 2001

(51) Int. Cl.⁷ .............................................. G09G 5/22
(52) U.S. Cl. ...................... 715/815; 715/864; 715/471; 715/801; 715/503
(58) Field of Search ................... 345/815, 864, 345/472, 471, 801; 715/503; 708/112

(56) References Cited

U.S. PATENT DOCUMENTS

| | | | | |
|---|---|---|---|---|
| 5,844,620 | A | * | 12/1998 | Coleman et al. .............. 725/54 |
| 6,256,650 | B1 | * | 7/2001 | Cedar et al. ................. 715/517 |
| 6,278,465 | B1 | * | 8/2001 | Nielsen ....................... 345/472 |
| 6,370,554 | B1 | * | 4/2002 | Sun-Woo .................... 708/112 |
| 6,441,824 | B2 | * | 8/2002 | Hertzfeld ..................... 345/472 |
| 6,452,597 | B1 | * | 9/2002 | Goldberg et al. ............ 345/472 |
| 6,591,292 | B1 | * | 7/2003 | Morrison et al. ........... 709/206 |

OTHER PUBLICATIONS

Microsoft, Microsoft Outlook 2000 SP–3, 1999, attached screen shot figures 7–8.*
Microsoft, Microsoft Outlook 2000 SP–3, 1999.*

* cited by examiner

Primary Examiner—Cao (Kevin) Nguyen
Assistant Examiner—Dennis G. Bonshock

(57) ABSTRACT

A method for displaying information, expressed as a sequence of alphanumeric characters, on a screen having a sequence of entry lines. Where a designated entry includes more than one line of characters: (1) one or more additional lines, associated with that entry, is added to receive the additional characters and/or (2) a font characteristic (font type, font size, etc.) or other display characteristic is changed to provide display of a larger number of characters on that entry line. A non-designated entry is allocated at most one line on a display. A non-designated entry that includes more than one line of characters has a distinguishable symbol appended.

28 Claims, 7 Drawing Sheets

| 9:00 | Meet with patent attorney and discuss pending filings |
| --- | --- |
| 10:00 | Conference call with accountant and banker |
| 11:00 | Dental appt |
| 12:00 | |
| 1:00 | Lunch with Bill Doe at McCormick's |

FIG. 1 (Prior Art)

| 9:00 | Meet with patent ... |
| --- | --- |
| 10:00 | Conference call with ... |
| 11:00 | Dental appt |
| 12:00 | |
| 1:00 | Lunch with Bill Doe at ... |
| 2:00 | Staff meeting |
| 3:00 | |
| 4:00 | Golf with Tom |
| 5:00 | |

FIG. 2a

| 9:00 | Meet with patent... |
| --- | --- |
| 10:00 | Conference call with ... |
| 11:00 | Dental appt |
| 12:00 | |
| 1:00 | Lunch with Bill Doe at ... |
| 2:00 | |
| 3:00 | Staff meeting |
| 4:00 | Golf with Tom and his associates . |

FIG. 2b

| 9:00 | Meet with patent ... |
| --- | --- |
| 10:00 | Conference call with accountant and banker |
| 11:00 | Dental appt |
| 12:00 | |
| 1:00 | Lunch with Bill Doe at ... |
| 2:00 | Staff meeting |
| 3:00 | |
| 4:00 | Golf with Tom |

FIG. 3a

| 9:00 | Meet with patent ... |
| --- | --- |
| 10:00 | Conference call with accountant and banker |
| 11:00 | Dental appt |
| 12:00 | |
| 1:00 | Lunch with Bill Doe at ... |
| 2:00 | Staff meeting |
| 3:00 | |
| 4:00 | Golf with Tom |

FIG. 3b

| 9:00 | Meet with patent ... |
| --- | --- |
| 10:00 | Conference call with accountant and banker |
| 11:00 | Dental appt |
| 12:00 | |
| 1:00 | Lunch with Bill Doe at McCormick's |
| 2:00 | Staff meeting |
| 3:00 | |

FIG. 3c

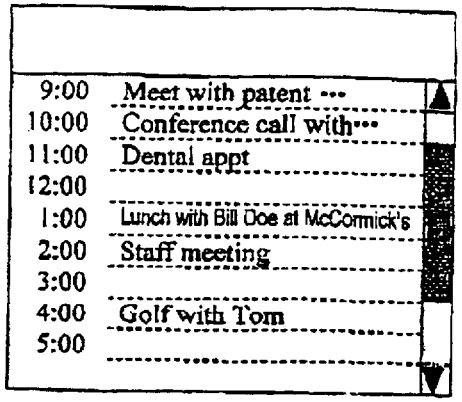
FIG 3d
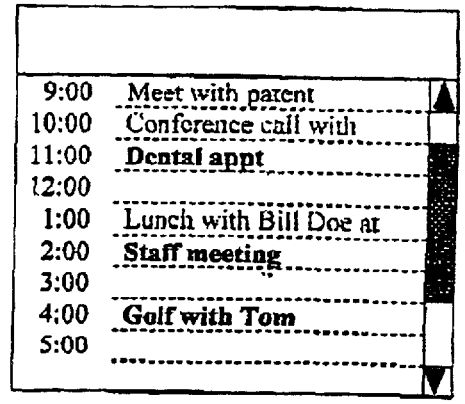
FIG 4c (different color, texture and/or background)
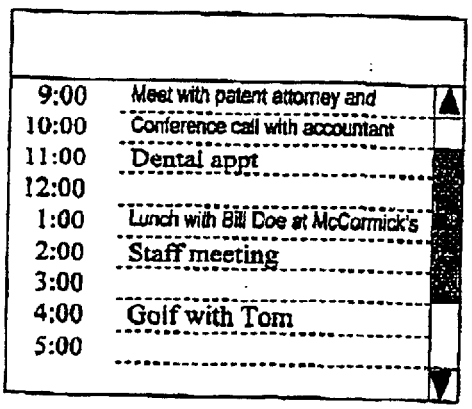
FIG 4a
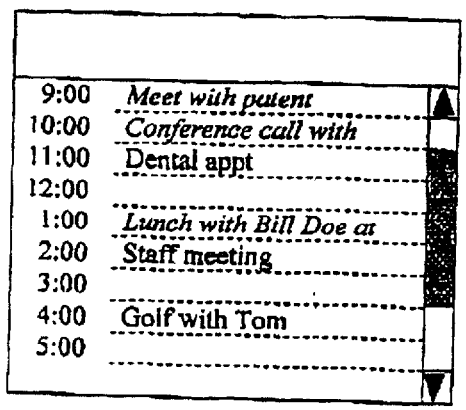
FIG 4b

|  |
|---|
| Start: 11:10 am ▼ |
| End: 12:00 am ▼ |
| Alarm: Off ▼ |
| Repeat: None ▼  Until |

FIG. 8

| 9:00 | Meet with patent... |
|---|---|
| 10:00 | Conference call with ••• |
| 11:00 | Dental appt |
| 11:10 |  |
| 12:00 |  |
| 1:00 | Lunch with Bill Doe at ••• |
| 2:00 |  |
| 3:00 | Staff meeting |
| 4:00 | Golf with Tom |

FIG. 10

March 2001

| S | M | T | W | T | F | S |
|---|---|---|---|---|---|---|
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | ■ | 28 | 29 | 30 | 31 |

FIG. 9

MULTI-LINE EDITOR FOR COMPACT DISPLAY

FIELD OF THE INVENTION

This invention relates to display screens for pervasive hand held computing and electronics devices.

BACKGROUND OF THE INVENTION

Handheld portable electronic computing devices, such as radiotelephones and personal digital assistants (collectively referred to as "handheld devices"), often provide a text editor for entering alphanumeric characters, including punctuation marks and other special symbols. A text editor, embedded in a handheld device, operates in a manner similar to the manner a conventional text editor works with a PC or Macintosh for entering such characters: the text editor receives entered characters and optionally displays these characters on a display screen. A computer, equipped with a large screen such as a CRT and/or a large LCD, provides an adequate display area for multiple entries simultaneously without scrolling. However, a handheld device, which has a much smaller display screen (typically, between 5 and 16 lines for editing), offers a greater challenge for displaying multiple entries in a screen without scrolling; this challenge is increased where an entry requires multiple lines because the characters for that entry fill more than one line.

What is needed is a text editor system that automatically provides a display of as many lines of information for a designated entry as is permitted by the screen size, where scrolling is minimized. Preferably, the system should permit expansion of an entry to a maximum number of lines on the screen, as required for adequate display of a designated entry in an expanded mode, and should permit contraction of a non-designated entry to a single line where the circumstances do not require more. Preferably, the system should provide visually distinguishable entries where special circumstance exist.

SUMMARY OF THE INVENTION

These needs are met by the invention, which provides a multi-line text editor system, optionally touch sensitive, having a capability to expand or contract the number of lines allocated to display of one or more entries. A non-designated entry on a screen is displayed in a contracted mode, in which an entry is allocated one line, the content of the entry is truncated, and a special symbol is appended as needed to indicate the presence of one or more additional characters that are not displayed. Optionally, a line in contracted mode may be displayed using a distinguishable color, texture, background, font size and/or font style.

A designated entry (zero, one or more per screen) is displayed in an expanded mode, in which the entry is allocated whatever number of lines is required for full display of the content of that entry. Alternatively, a designated entry can be displayed with a changed font characteristic (size, style, etc.) that increases the number of characters displayed on a line. After entry of characters into a designated first entry is completed and a second entry becomes designated, the first entry is displayed in a contracted mode, unless the first entry is redesignated. The entries shown on a screen (in contracted mode or in expanded mode) can be scrolled up and/or down to provide a complete view of all entry lines. Optionally, each entry can be separately declared to be in expanded mode or in contracted mode.

BRIEF DESCRIPTION OF THE DRAWINGS

FIG. 1 illustrates a scheduling list for a specified time interval (e.g., an appointment book page for a given day), as displayed by a prior art device.

FIGS. 2A and 2B illustrate an appointment book page according to the invention, where no (designated) entry and one (designated) entry, respectively, are displayed in an expanded mode.

FIGS. 3A, 3B, 3C and 3D illustrate display of a designated entry in expanded mode in several embodiments.

FIG. 4A illustrates means by which an entry can be displayed in expanded or contracted mode.

FIGS. 4B and 4C illustrate means by which an entry can be displayed in a contracted mode.

FIGS. 8, 9 and 10 illustrate screens used in editing an entry according to the invention.

DESCRIPTION OF BEST MODES OF THE INVENTION

Figure 5:
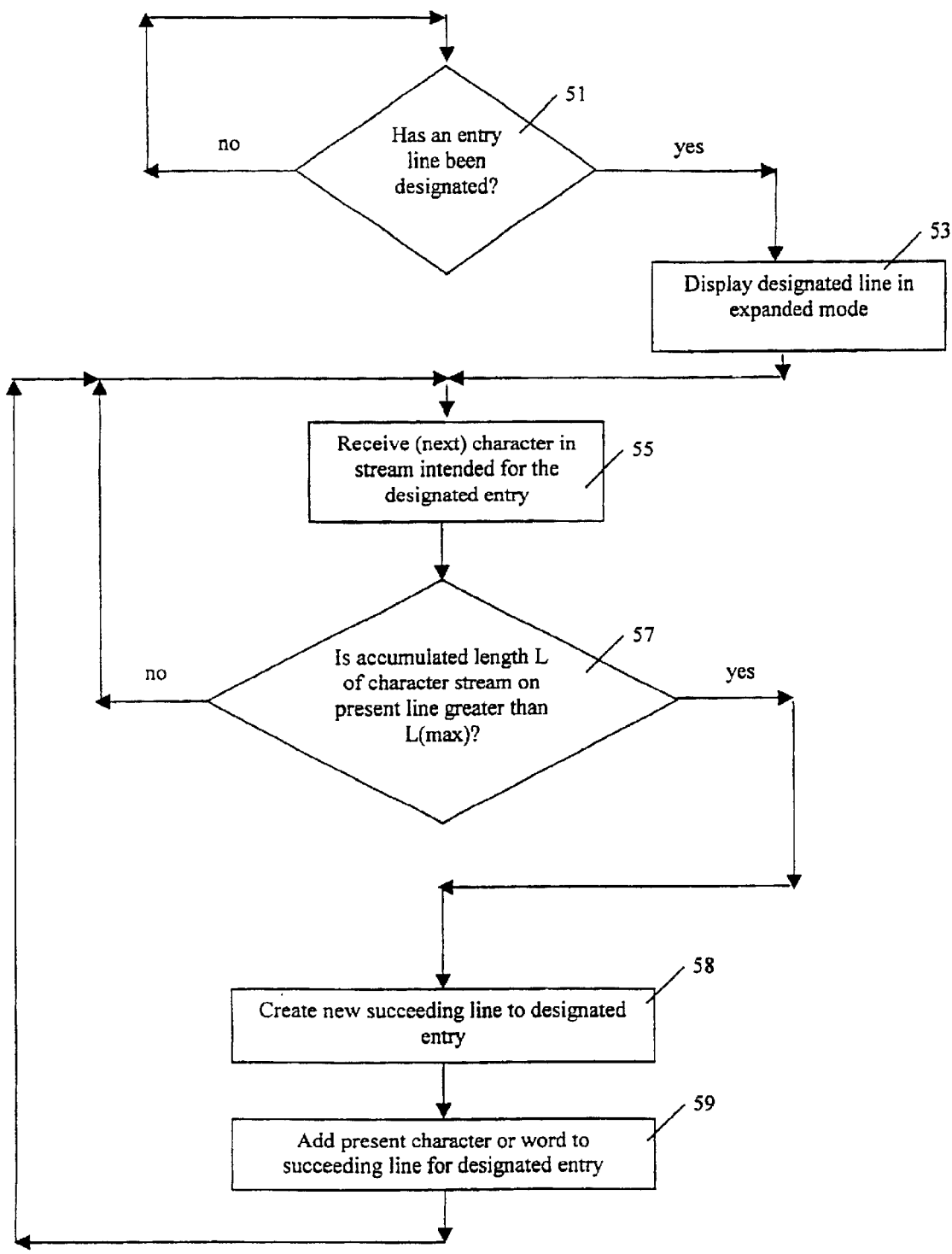
FIGS. 5, 6 and 7 are flow charts of procedures for practising the invention.

A display screen for a hand held device is usually quite small, as small as 5–16 lines with each line limited to 10–28 characters. Because these screens are intended to serve only one or a few limited purposes, a single layer of content on a screen is usually provided for the device user, and the number of entries displayed on a screen is usually limited by the amount of detail required by each entry. Display of the entire content of an entry for viewing purposes becomes severely hindered if the space used by each entry is substantial.

FIG. 1 illustrates a screen that displays a scheduling list in a conventional format, in one-hour time intervals for a given day, with some intervals filled in for this screen. Each entry is initially allocated one line of AN characters, and a small number of characters (e.g., 20) will normally fill the line allocated for that entry. Where an entry requires more than one line, as in the entries for 9:00, for 10:00 and for 1:00, a conventional system automatically displays extra lines for all such entries on the same screen. This approach consumes lines for each of the multiple-line entries that might better be used to display additional one-line entries.

FIG. 2A illustrates a screen for a scheduling list, configured according to the invention, in which no entry is "designated" or affirmatively activated. In this non-designated situation, all entries appear in contracted mode, and each such entry is allocated at most one line. Where an entry would require more than one line for adequate display of the line content, as in the entries for 9:00, 10:00 and 1:00 in FIG. 1, this entry is truncated, and the presence of extra AN characters (not displayed) is indicated by appending a selected visually distinguishable symbol, such as two or more consecutive dots ( . . . ) adjacent to an end of the entry line, to indicate that additional characters are present but not displayed.

FIG. 2B illustrates a screen in which additional words and one or more additional lines have been added to an entry at 4:00, and the entry has automatically become designated, and thus displayed in expanded mode, with all other entries being displayed in contracted mode. In an expanded mode, at least one display characteristic (number of lines, font size, font style, etc.) for the entry is changed relative to display of the entry in a contracted (non-designated) mode.

In FIGS. 3A, 3B, 3C and 3D, an entry is designated or activated, because that entry is being read or is being edited, or because additional characters are presently being added to that entry. As a result, more than one line is often required for adequate display of that entry. An entry is designated (1) by moving a cursor to a line of that entry on a screen and activating the line, (2) by moving an icon on the screen (e.g., a mouse icon) to a line of that entry and activating the line, (3) by pressing on a line of that entry on the screen with a stylus, or (4) by any other suitable means of entry designation.

In a preferred embodiment, at most one entry per screen is designated and thus appears in an expanded mode. In another embodiment, one or more (or all) entries can be declared to be in an expanded mode. In another embodiment, one or more (or all) entries can be declared to be in a contracted mode.

When an entry becomes a designated entry, this entry automatically appears in expanded mode, with additional lines displayed for this line as needed. Where at most one entry is displayed in expanded mode, this approach maximizes the number of contracted entries that can be displayed on the screen, in addition to a designated entry line. This is illustrated in FIG. 3A, for example, where only the entry for 10:00 ("Conference call with accountant and banker") appears in expanded mode, with two consecutive lines allocated for full display of that entry. Optionally, a designated entry may also be displayed in a visually distinguished mode, for example in reverse video, as illustrated in FIG. 3B for the designated entry at 10:00. In FIG. 3C, two entries, at 10:00 and at 1:00, appear in expanded mode, and the 4:00 entry in FIG. 3B disappears in order to accommodate the two lines that now appear in the 1:00 entry. In FIG. 3D, an entry at 1:00 appears in expanded mode (in a single line) through use of a smaller font size and/or different font style for that entry.

After entry of information on a first entry is completed and the user designates a second (different) entry, the system normally displays the first entry in a contracted mode, allocating one line to the first entry, truncating a display of characters on that first entry line as needed, and appending the selected symbol to the first entry line as needed, as illustrated in FIG. 2A. However, a contracted mode entry can be (re)designated for viewing, and the designated entry again appears in expanded mode with as many lines displayed as are needed.

Where a keypad is used to provide AN characters for an entry, the screen automatically adds one or more additional lines for a given entry line or time interval, as appropriate, when the space required for display of the entered AN characters exceeds the space available on the initially allocated single line. Where a stylus is used to enter AN characters for a given time interval, the line initially allocated to that entry line is first designated, for example, by tapping or pressing that entry with the stylus. An edit cursor will sometimes be displayed at the end of an entry that has been indicated or added to by a keypad or stylus. In either approach, as another line is added to a designated entry, the lines displayed below that entry are moved down one or more lines to accommodate the additional line(s) added to the designated entry, as illustrated in FIG. 3C, where the line for a 4:00 entry is not shown because the 1:00 entry now has two lines. Until another entry is designated, the system assumes that all AN characters are intended to be entered for the last entry that was activated, and the system allocates additional lines for that entry to accommodate the AN characters presented.

Preferably, the system imposes a maximum on the number of additional lines allocated to a designated entry (e.g., 2–6 additional lines), beyond which a "hard" truncation of the number of characters in a given entry is enforced, independently of the number of lines needed for full display of an entry.

Alternatively, where a given entry requires more than one entry line of characters, the system can display the designated entry information with an altered font characteristic, such as a smaller font type and/or different font style for that entry only, in order to reduce, within limits, the space that must be allocated to that entry. For example, a Times or New York serif font can be replaced by an Ariel, Geneva, Helvetica or Monaco sans serif font that may permit display of more AN characters on a line of given length than does the font normally used and/or the font size may be reduced (e.g., from 12 point to 9 point). These actions are illustrated in FIG. 3D, where use of a smaller font size (9 point) and of a different font style (Ariel narrow) for a designated entry at 1:00 permits display of this entry on one line. An altered font size (larger or smaller) and/or altered font style can also be used to visually distinguish contracted mode entries (altered) from an expanded mode entry (unaltered).

FIGS. 4A, 4B and 4C illustrate embodiments, in which a non-designated entry is displayed with a different font size and/or font style (FIG. 4A), with italics or another visually distinguishable font characteristic (FIG. 4B), or with a visually distinguishable color, texture and/or background (FIG. 4C), relative to the remainder of the information displayed on the screen, to distinguish a contracted mode display from an expanded mode display.

FIG. 5 is a flow chart of a first procedure for practising the invention. In step 51, the system determines if an entry has been designated. If the answer to the query in step 51 is "no," the system returns to step 51. If the answer to the query in step 51 is "yes," the designated entry is displayed in expanded mode, in step 53. In step 55 (optional), the system receives one or more AN characters intended for a single designated entry. In step 57, the system determines if the accumulated length L of the present line of the stream of AN characters is greater than a threshold length L(max). If the answer to the query in step 57 is "no," the system returns to step 55 and continues to add each AN character, as the character is received, to the present designated entry. If the answer to the query in step 57 is "yes," the system creates a new succeeding line, immediately below the line presently being filled for this entry, in step 58, adds the present character (or, preferably, the word that includes the present character) to the new succeeding line, in step 59, and returns to step 55.

Figure 6:
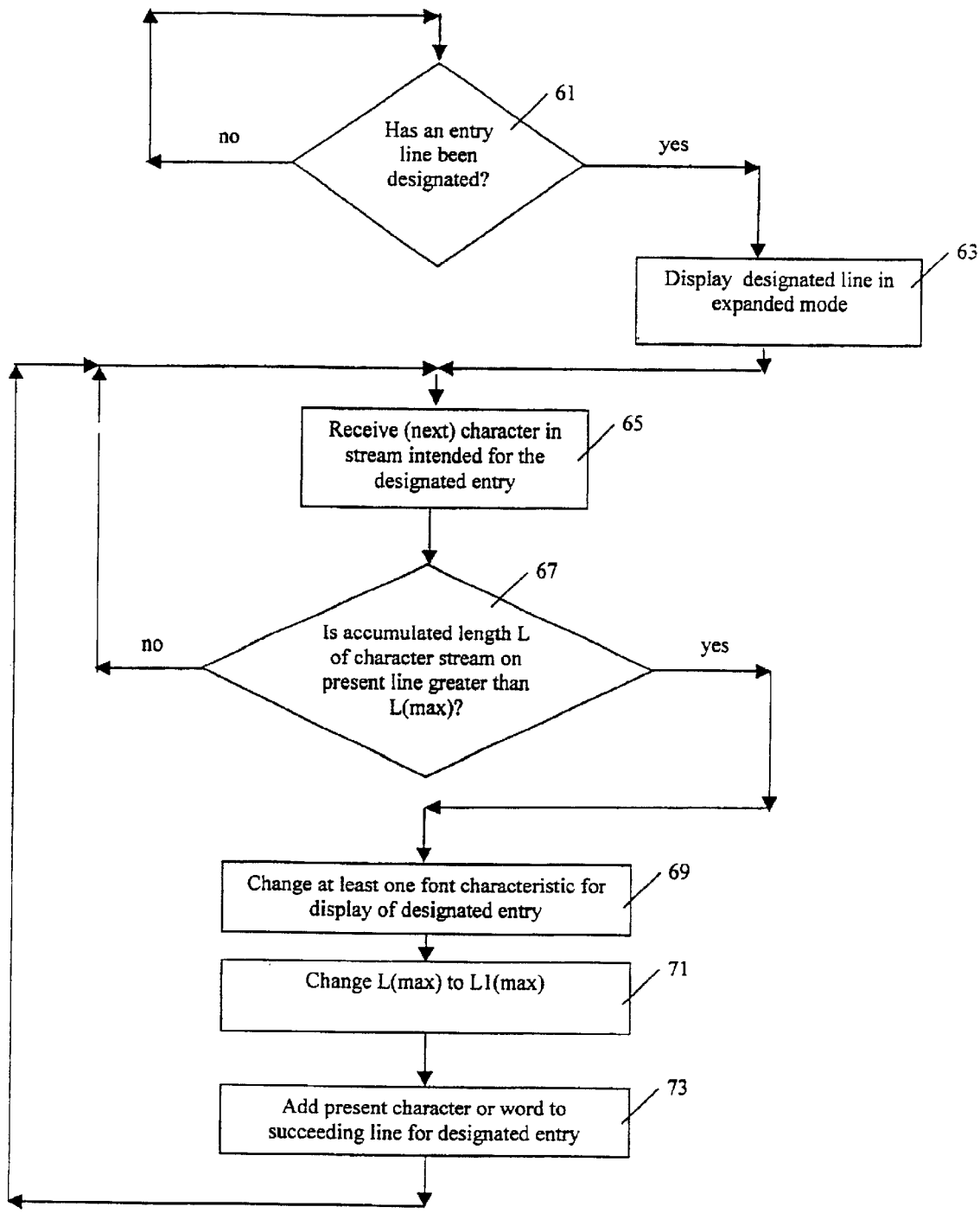

FIG. 6 is a flow chart of a second procedure for practising the invention. In step 61, the system determines if an entry line has been designated. If the answer to the query in step 61 is "no," the system returns to step 61. If the answer to the query in step 61 is "yes," the designated entry line is displayed in expanded mode, in step 63. In step 65 (optional), the system receives one or more AN characters intended for a single designated entry. In step 67, the system determines if the accumulated length L of the present line of the stream of AN characters is greater than a threshold length L(max). If the answer to the query in step 67 is "no," the system returns to step 65 and continues to add each AN character, as the character is received, to the present entry line. If the answer to the query in step 67 is "yes," the system changes at least one font characteristic (font size, font style, etc.) for the displayed present entry line to accommodate a larger number of characters per line, in step 69, changes the value L(max) to a new value L1(max) that is consistent with the changed font characteristic, in step 71, adds the received character, using the changed font characteristic, to the present entry line, in step 73, and returns to step 65.

Features in the flow charts in FIGS. 5 and 6 can be combined so that, when the number of AN characters in the present designated entry (displayed with changed font characteristic) exceeds L1(max), the system adds a new succeeding line and continues to use a font with the changed font characteristic for that entry.

Figure 7:
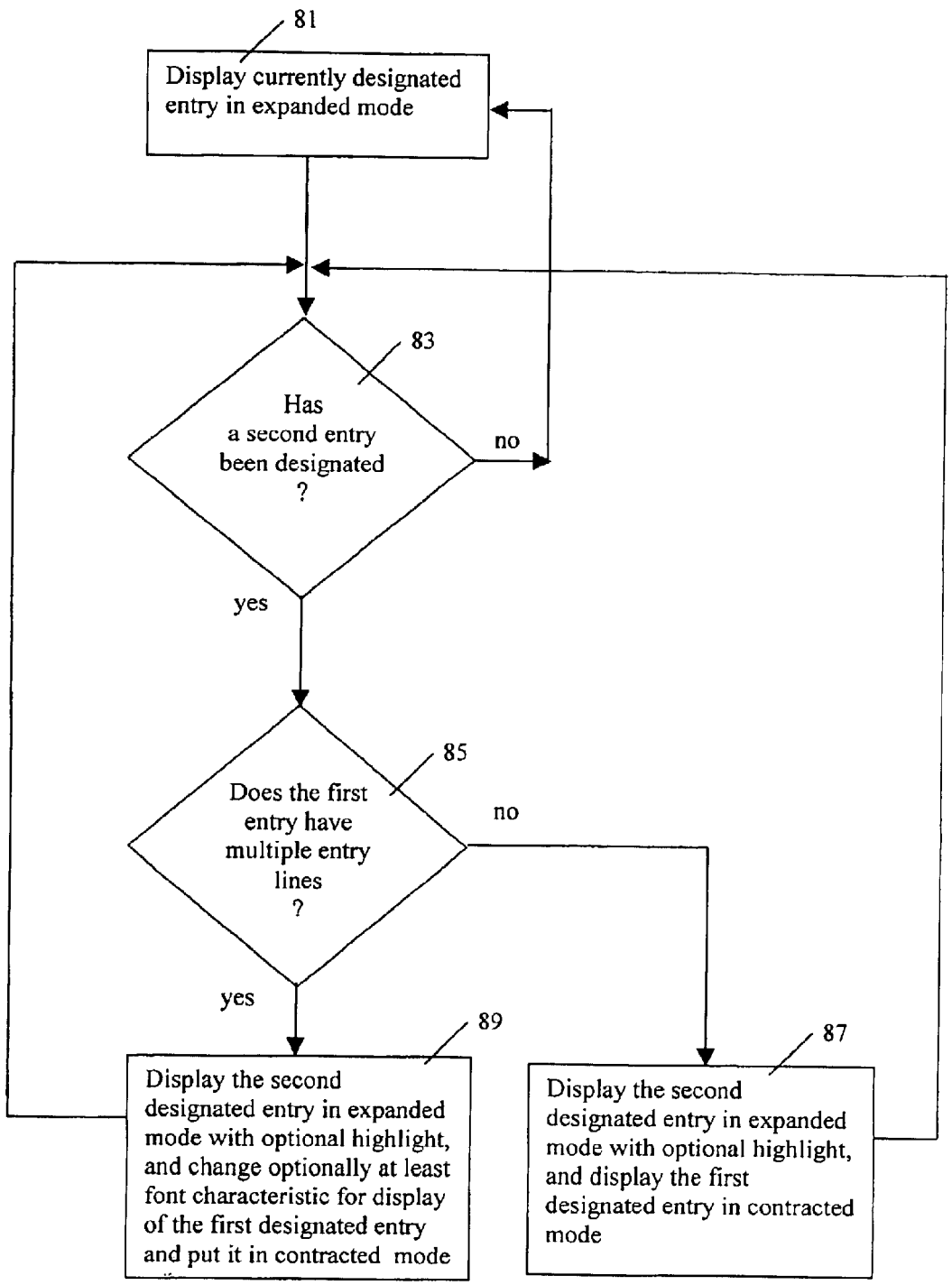

FIG. 7 is a flow chart of a procedure for editing one or more entries on a screen. In step 81, the system displays a first designated entry in expanded mode. In step 83, the system determines if a second (different) entry has been designated. If the answer to the query in step 83 is "no," the system returns to step 81. If the answer to the query in step 83 is "yes," the system moves to step 85 and determines if the first entry has more than one entry line. If the answer to the query in step 85 is "no," the second entry is displayed in expanded mode, and the first entry (no longer designated) is displayed in contracted mode, in step 87. If the answer to the query in step 85 is "yes," the system displays the second entry in expanded mode, changes at least one font characteristic for the first entry, and displays the first entry in contracted mode, in step 89.

The invention permits editing (1) by addition, deletion and/or change of one or more characters appearing in an entry, (2) by addition or deletion of one or more characters by receipt of a handwritten word or phrase (printed or cursive), and (3) by addition of one or more specified time intervals, with editable entry, to the display on the screen. Addition, deletion and/or change of one or more characters in an entry is implemented using a keypad, a touch screen with pen, a stylus or similar information entry mechanism.

Addition of one or more specified time intervals is implemented as follows. Assume that a user wishes to add a time interval, for example, beginning at 11:10, to the display shown in FIG. 2A. The user brings up a pop-up screen, illustrated in FIG. 8, and specifies a beginning time (here, 11:10 a.m.) for a time interval and a date (if different from today's date) for which the specified time interval will appear. A calendar, illustrated in FIG. 9, indicates the specified date or dates for which the specified time interval will appear. Optionally, the specified time interval can be added for one or more or all days in a specified week, a specified month or a specified year. The user then activates entry of the new specified time interval, and the appointment book display corresponding to FIG. 2A now becomes the appointment book display illustrated in FIG. 10.

Figure 11:
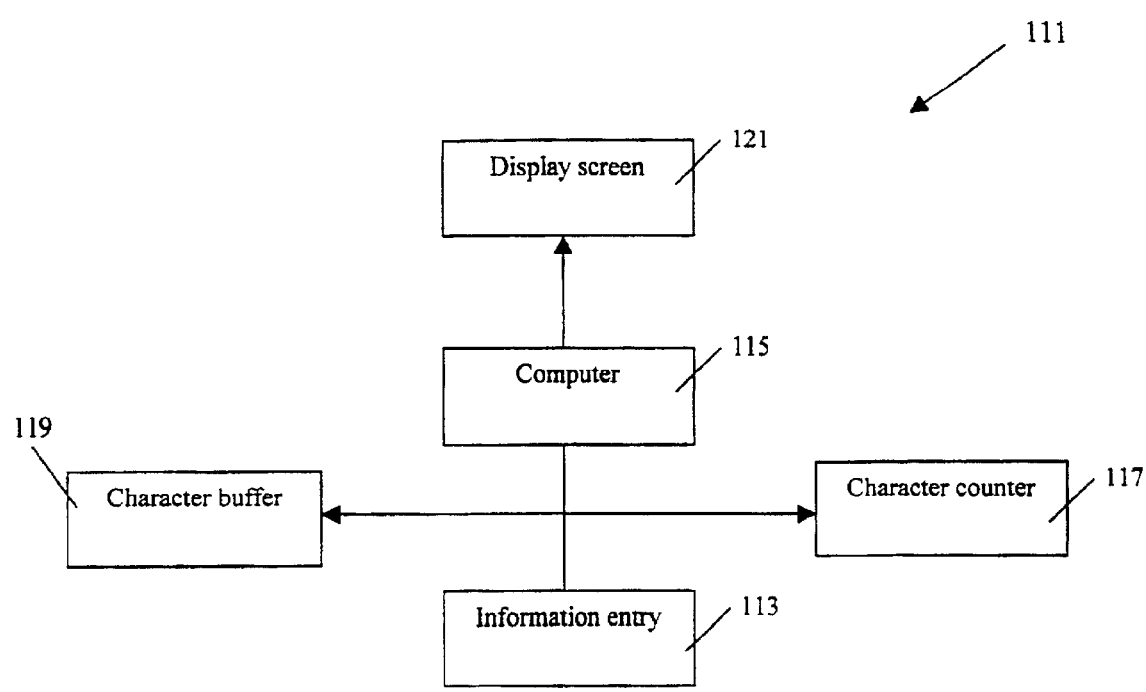
FIG. 11 schematically illustrates a system for practising the invention.

FIG. 11 schematically illustrates a system 111 that implements the invention. The system 111 includes an information entry mechanism 113 (e.g., a keypad or stylus), a computer or microprocessor 115 that receives AN characters from the information entry device 113, an AN character counter 117 that counts the number of characters entered on the presently designated entry line, a character buffer 119 associated with the computer 115 that holds all AN characters entered for each entry line, designated or not, and a display screen 121 that displays two or more entry lines as commanded by the computer 115. The computer 115 receives information on which entry line, if any, is designated, receives the present count on AN characters for the designated line from the counter 117, provides a command for the display screen 121 to provide one or more extra lines, if required, to display the AN characters for the designated entry in expanded mode. The computer also provides an ordered sequence of AN characters from the buffer 119 for a designated entry (to be displayed in expanded mode) and for each non-designated entry (to be displayed in contracted mode) for the display screen. Optionally, the information entry device 113, the AN character counter 117 and/or character buffer 119 may be incorporated in the computer 115.

As indicated in the preceding, one or more entries may be declared to be in an expanded mode, and each such declared entry will appear, as needed, with more than one line and/or with a different font size and/or different font style and/or in reverse video in order to accommodate a sequence of characters that normally requires more than one line. One or more entries, or even all entries on a screen, can be declared to be in a contracted mode. At most one line is allocated to a contracted mode entry and/or this entry is displayed in a different font size and/or different font style and/or with a different and/or with a different color, texture and/or background (e.g., in reverse video). More than one entry can be simultaneously declared to be in an expanded mode, by activating or indicating a special icon or symbol or by entering a special command into the system.

What is claimed is:

1. A method for display of information, expressed as a sequence of alphanumeric characters, in one or more entries on a single display layer of a display screen, the method comprising:

designating at least one first entry of alphanumeric characters on the single display layer;

displaying the at least one designated first entry in an expanded mode in which full display of the information of the designated entry is displayed;

displaying any entry that is not a designated entry in a contracted mode in which at most one line of the non-designated entry is displayed;

determining if a non-designated entry has become a designated second entry; and when the non-designated entry becomes the designated second entry:

(i) displaying the designated second entry automatically in the expanded mode, and automatically changing the at least one designated first entry to a non-designated second entry, displaying the non-designated second entry automatically in the contracted mode; and (ii) when at least one of the designated second entry and the at least one designated first entry has at least two consecutive lines, automatically moving down at least one entry line displayed below the designated second entry, and automatically moving up at least one entry line displayed below the at least one designated first entry that has changed to the non-designated second entry.

2. The method of claim 1, further comprising designating at least two of said entries of said alphanumeric characters on said display layer.

3. The method of claim 1, further comprising displaying at least one of said non-designated entries in a mode that is visually distinguishable from at least one of said at least one designated first entry and said designated second entry.

4. The method of claim 3, further comprising choosing said visually distinguishable mode from the group of display modes consisting of: a display font size for said non-designated entry that is different from a display font size for at least one of said designated first and second entries, a display font style for said non-designated entry that is different from a display font style for at least one of said designated first and second entries, a display font for said non-designated entry that has a different color than a display color for at least one of said designated first and second entries, and a display for said non-designated entry that has a different background than a display background for at least one of said designated first and second entries.

5. The method of claim 1, further comprising displaying at least one of said at least one designated first entry and said designated second entry in a mode that is visually distinguishable from at least one of said non-designated entries.

6. The method of claim 5, further comprising choosing said visually distinguishable mode from the group of display modes consisting of: reverse video display for at least one of said designated first and second entries, a display font size for at least one of said designated first and second entries that is different from a display font size for said non-designated entry, a display font style for at least one of said designated first and second entries that is different from a display font style for said non-designated entry, a display font for at least one of said designated first and second entries that has a different color than a display color for said non-designated entry, and a display for said at least one of designated first and second entries that has a different background than a display background for said non-designated entry.

7. The method of claim 1, further comprising: when at least one of said non-designated entries requires more than one line for display of characters for the at least one non-designated entry, appending a visually distinguishable symbol to said displayed line for the at least one non-designated entry.

8. The method of claim 7, further comprising choosing said visually distinguishable symbol to be a sequence of two or more periods adjacent to an end of said line for said at least one non-designated entry.

9. The method of claim 1, further comprising:
receiving a sequence of said alphanumeric characters that is to be entered into at least one of said at least one designated first entry and said designated second entry;
as each of said characters to be entered is received by at least one of said at least one designated first entry and said designated second entry, determining if a length L for a present entry line of said characters exceeds a selected threshold length L(max); and
when the length L for the present entry line of said characters exceeds the length L(max), adding at least one new line of said characters as a succeeding line to display all of said characters for at least one of said at least one designated first entry and said designated second entry.

10. The method of claim 9, further comprising displaying at least one of said at least one designated first entry and said designated second entry in a mode that is visually distinguishable from at least one of said non-designated entries.

11. The method of claim 1, further comprising:
receiving a sequence of said alphanumeric characters that is to be entered into at least one of said at least one designated first entry and said designated second entry;
as each of said characters to be entered is received by at least one of said at least one designated first entry and said designated second entry, determining if a length L for a present entry line of said characters exceeds a selected threshold length L(max); and
when the length L for the present entry line of said characters exceeds the length L(max):
(i) changing at least one font characteristic for a display of the sequence of said characters on the entry line so that a greater number of said characters can be displayed; and
(ii) changing the threshold number L(max) to a larger number L1(max) that corresponds to the greater number of said characters that can be displayed on the entry line with the changed font characteristic.

12. The method of claim 11, further comprising displaying at least one of said at least one designated first entry and said designated second entry in a mode that is visually distinguishable mode from at least one of said non-designated entries.

13. The method of claim 11, further comprising:
when said number of characters in said sequence exceeds said threshold number L1(max), adding at least one display line as a succeeding line to said entry line and displaying said sequence of said characters on said entry line and the at least one succeeding line.

14. The method of claim 11, further comprising choosing said changed font characteristic from a group of font characteristics consisting of: a changed font style and a changed font size.

15. A system for display of information, expressed as a sequence of alphanumeric characters, in one or more entries on a single display layer of a display screen, the system comprising:
a display screen that displays at least two lines of alphanumeric characters;
a computer that controls the display screen and that is programmed:
to receive a designation of at least one first entry of alphanumeric characters on a single display layer;
to display the at least one designated first entry in an expanded mode in which fill display of the information of the designated entry is displayed;
to display any entry that is not a designated entry in a contracted mode in which at most one line of the non-designated entry is displayed;
to determine if one of the non-designated entries has become a designated second entry; and
when the non-designated entry becomes the designated second entry:
(i) to display the designated second entry automatically in the expanded mode, and to automatically change the at least one designated first entry to a non-designated second entry that is displayed automatically in the contracted mode; and
(ii) when at least one of the designated second entry and the at least one designated first entry has at least two consecutive lines, to automatically move down at least one entry line displayed below the designated second entry and to automatically move up at least one entry line displayed below the at least one designated first entry that has changed to the non-designated second entry.

16. The system of claim 15, wherein at least two of said entries of said alphanumeric characters are designated on said display layer.

17. The system of claim 15, wherein said computer is further programmed to display at least one of said non-designated entries in a mode that is visually distinguishable from at least one of said at least one designated first entry and said designated second entry.

18. The system of claim 17, wherein said computer is further programmed to choose said visually distinguishable mode from the group of display modes consisting of: a display font size for said non-designated entry that is different from a display font size for at least one of said designated first and second entries, a display font style for said non-designated entry that is different from a display font style for at least one of said designated first and second entries, a display font for said non-designated entry that has a different color than a display color for at least one of said designated first and second entries, and a display for said non-designated entry that has a different background than a display background for at least one of said designated first and second entries.

19. The system of claim 15, wherein said computer is further programmed to display at least one of said at least one designated first entry and said designated second entry in a mode that is visually distinguishable from at least one of said non-designated entries.

20. The system of claim 19, wherein said computer is further programmed to choose said visually distinguishable mode from the group of display modes consisting of: reverse video display for at least one of said designated first and second entries a display font size for at least one of said designated first and second entries that is different from a display font size said non-designated entry, a display font style for at least one of said designated first and second entries that is different from a display font style for said non-designated entry, a display font for at least one of said designated first and second entries that has a different color than a display color for said non-designated entry, and a display for at least one of said designated first and second entries that has a different background than a display background for said non-designated entry.

21. The system of claim 15, wherein said computer is further programmed so that, when at least one of said non-designated entries requires more than one line for display of characters for the at least one non-designated entry, a visually distinguishable symbol is appended to said displayed line for the at least one non-designated entry.

22. The system of claim 21, wherein said computer is further programmed to choose said visually distinguishable symbol to be a sequence of two or more periods adjacent to an end of said line for said at least one non-designated entry.

23. The system of claim 15, wherein said computer is further programmed:

to receive a sequence of said alphanumeric characters that is to be entered into at least one of said at least one designated first entry and said designated second entry;

as each of said characters to be entered is received by at least one of said at least one designated first entry and said designated second entry, to determine if a length L for a present entry line of said characters exceeds a selected threshold length L(max); and when the length L for the present entry line of said characters exceeds the length L(max), to add at least one new line of said characters as a succeeding line to display all of said characters for at least one of said at least one designated first entry and said designated second entry.

24. The system of claim 23, wherein said computer is further programmed to display at least one of said at least one designated first entry and said designated second entry in a mode that is visually distinguishable from at least one of said non-designated entries.

25. The system of claim 15, wherein said computer is further programmed:

to receive a sequence of said alphanumeric characters that is to be entered into at least one of said at least one designated first entry and said designated second entry;

as each of said characters to be entered is received by at least one of said at least one designated first entry and said designated second entry, to determine if a length L for a present entry line of said characters exceeds a selected threshold length L(max); and when the length L for the present entry line of said characters exceeds the length L(max):

(i) to change at least one font characteristic for a display of the sequence of said characters on the entry line so that a greater number of said characters can be displayed; and (ii) to change the threshold number L(max) to a larger number L1(max) that corresponds to the greater number of said characters that can be displayed on the entry line with the changed font characteristic.

26. The system of claim 25, wherein said computer is further programmed to display at least one of said at least one designated first entry and said designated second entry in a mode that is visually distinguishable mode from at least one of said non-designated entries.

27. The system of claim 25, wherein said computer is that:

when said number of characters in said sequence exceeds said threshold number L1(max), at least one display line is added as a succeeding line to said entry line and said sequence of said characters is displayed on said entry line and the at least one succeeding line.

28. The system of claim 25, wherein said computer is further programmed to choose said changed font characteristic from a group of font characteristics consisting of: a changed font style and a changed font size.

* * * * *